US006982952B2

United States Patent
Halliday et al.

(10) Patent No.: US 6,982,952 B2
(45) Date of Patent: Jan. 3, 2006

(54) METHOD AND APPARATUS FOR BYPASSING A PAYLOAD NODE

(75) Inventors: David J. Halliday, West Leake (GB); Charles C Hill, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 23 days.

(21) Appl. No.: 10/828,126

(22) Filed: Apr. 20, 2004

(65) Prior Publication Data

US 2005/0232143 A1    Oct. 20, 2005

(51) Int. Cl.
    *H04L 12/26*    (2006.01)
(52) U.S. Cl. .................. 370/217; 370/221; 370/225; 370/351
(58) Field of Classification Search ................ 370/216, 370/217, 221, 225, 227, 228, 401–404, 347, 370/351, 541, 536–528
    See application file for complete search history.

(56) References Cited

U.S. PATENT DOCUMENTS 5,440,540 A * 8/1995 Kremer ...................... 370/223
5,521,903 A * 5/1996 English et al. ............... 370/248
6,091,714 A * 7/2000 Sensel et al. ................ 370/260
6,275,510 B1 * 8/2001 Koenig et al. ............... 370/535

* cited by examiner

*Primary Examiner*—Steven Nguyen
*Assistant Examiner*—Roberta Shand
(74) *Attorney, Agent, or Firm*—Kevin D. Wills

(57) ABSTRACT

A multi-service platform system (100) includes a rear transition module (102) coupled to receive a DSX signal (105) and a payload node (104) coupled to the rear transition module via a backplane (110), where the payload node is coupled to process the DSX signal. A secondary payload node (114) is coupled to secondary rear transition module (112) via the backplane. A protection bus (150) couples the rear transition module to the secondary rear transition module outside the backplane, where failure of the payload node operates to shunt the DSX signal through the rear transition module to the secondary rear transition module. Failure of the payload node operates to switch processing of the DSX signal from the payload node to the secondary payload node, and the secondary rear transition module independently controls shunting of the DSX signal through the rear transition module to the secondary rear transition module.

7 Claims, 2 Drawing Sheets

METHOD AND APPARATUS FOR BYPASSING A PAYLOAD NODE

BACKGROUND OF THE INVENTION

Prior art methods of receiving time division multiplexed (TDM) signals into a chassis-type network include channeling DSX signals to each individual payload node or using a dedicated path (as provided in H.110) to distribute DSX signals to payload nodes within a chassis. In such a system, it is desirable to have in place a reliable failover mechanism if a payload node fails. Prior art methods of accomplishing this include proprietary means using specialized buses incorporated into the backplane of the computer system chassis. The prior art required modification of the standard backplane system to accommodate a failover mechanism. Other prior art methods require equipment external to the chassis to provide a failover mechanism. These prior art methodologies have the disadvantage of requiring additional complexity, cost and operator attention. It is desirable to provide a failover mechanism using an N+1 configuration and one that fits within existing chassis without modification of the backplane.

Accordingly, there is a significant need for an apparatus and method that overcomes the disadvantages of the prior art outlined above.

BRIEF DESCRIPTION OF THE DRAWINGS

Referring to the drawing.

Figure 1:
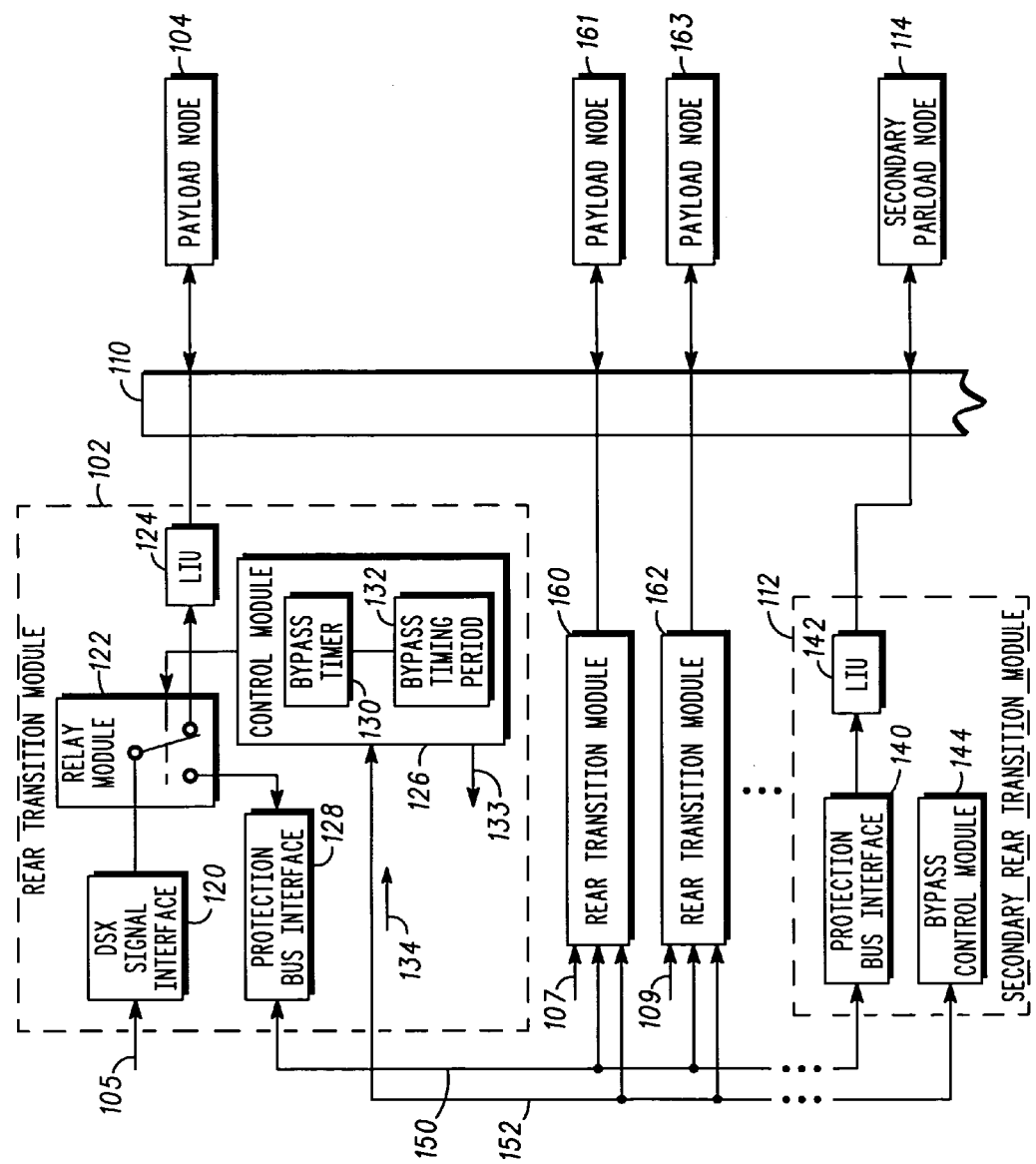
FIG. 1 depicts a block diagram of a multi-service platform system according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures, software blocks and techniques have not been shown in detail in order not to obscure the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a block diagram of a multi-service platform system 100 according to one embodiment of the invention. Multi-service platform system 100 can include a multi-service platform system chassis, with software and any number of slots for inserting nodes, for example, rear transition module 102, 160, 162, payload node 104, 161, 163, secondary rear transition module 112 and secondary payload node 114. In an embodiment, a backplane 110 can be used for connecting nodes placed in slots. Backplane 110 can be a packet switched backplane or a multi-drop parallel bus backplane, or both as is known in the art. As an example of an embodiment, a multi-service platform system 100 can include chassis having model MCIP805 manufactured by Motorola Computer Group, 2900 South Diablo Way, Tempe, Ariz. 85282. The invention is not limited to this model or manufacturer and any multi-service platform system is included within the scope of the invention.

As shown in FIG. 1, multi-service platform system 100 can comprise any number of rear transition modules 102, 160, 162, payload nodes 104, 161, 163, a secondary rear transition module 112 and a secondary payload node 114 coupled via backplane 110. In an embodiment, rear transition module 102, 160, 162 can be inserted into slots of multi-service platform system 100 to provide an interface for non-packetized signals received by multi-service platform system 100. For example, rear transition modules 102, 160, 162 can receive time division multiplex (TDM) based signals, which can be DSX signals 105, 107, 109 respectively.

Payload nodes 104, 161, 163 can add functionality to multi-service platform system 100 through the addition of processors, memory, storage devices, I/O elements, and the like. In other words, payload nodes 104, 161, 163 can include any combination of processors, memory, storage devices, I/O elements, and the like, to give multi-service platform system 100 the functionality desired by a user. In an embodiment, a chassis can include slots for up to 18 payload nodes. In an embodiment, there can be 17 payload slots for 17 payload nodes in multi-service platform system 100 and one slot for secondary payload node 114, which acts as a standby. However, any number of payload slots and payload nodes are included in the scope of the invention.

In an embodiment, multi-service platform system 100 can include one or more switch nodes (not shown for clarity) as a central switching hub with any number of payload nodes as is known in the art. Switch node can further distribute packetized traffic to other Internet Protocol (IP) based networks.

Multi-service platform system 100 can be based on a point-to-point, switched input/output (I/O) fabric, a parallel multi-drop bus type network, and the like. Multi-service platform system 100 can include both node-to-node (for example computer systems that support I/O node add-in slots) and chassis-to-chassis environments (for example interconnecting computers, external storage systems, external Local Area Network (LAN) and Wide Area Network (WAN) access devices in a data-center environment). Although the embodiment depicted in FIG. 1 illustrates a single chassis, the method and apparatus can be practiced between multiple chassis and be within the scope of the invention.

In an embodiment, rear transition module 102 can receive any number of DSX signals 105 at DSX signal interface 120. DSX signal 105 represents one of a series of standard digital transmission rates based on DS0, a transmission rate of 64 kilobites per second (Kbps), the bandwidth normally used for one telephone voice channel. DS1, used as the signal in a T-1 carrier, carries a multiple of 24 DS0 signals or 1.544 Megabits per second (Mbps). DS3, the signal in a T-3 carrier, carries a multiple of 28 DS1 signals or 672 DS0 signals or 44.74 Mbps. Although DSX signal 105 is shown as only one path, it is understood that in an embodiment, DSX signal 105 can have both transmit and receive paths. DSX signal 105 is shown as a single path for clarity.

Rear transition module 102 can include DSX signal interface 120, which can be the physical connection allowing rear transition module 102 to receive DSX signal 105. For example, DSX signal interface 120 can include a BNC or TNC type connector for DSX signals as is known in the art. In another embodiment, DSX signal interface 120 can be an optical connection, such as OC3 optical fibers, or higher capacity fibers, and the like. DSX signal 105 can include TDM payload data, which can be time division multiplexed data, such as telephone voice data, and the like.

In an embodiment, DSX signal 105 can pass through relay module 122 to a line interface unit (LIU) 124, which can provide an interface for DSX signal to enter backplane 110. In an embodiment, LIU 124 can take the DSX signal 105 and convert it to 8 bit DS0 samples for further processing prior to entering backplane 110 and payload node 104.

In an embodiment, DSX signal or components thereof can be sent along backplane 110 to payload node 104 for further use or processing. In another embodiment, DSX signal or components thereof can be distributed to more than one payload node via backplane 110. In an embodiment, DSX signal can contain TDM payload data that can be communicated to payload node 104 for use or processing.

In an embodiment, line interface unit 124 can include a controller, which can be an intelligent platform management interface (IPMI) as is known in the art. In an embodiment, LIU 124 is coupled to provide an electrical interface with backplane 110. In an embodiment, electrical interface can be low voltage differential signaling (LVDS). In an example of an embodiment, electrical interface can be a standard 100BaseT Ethernet physical connection, and the like.

In the embodiment shown in FIG. 1, multi-service platform system 100 is shown in an N+1 configuration, which includes N payload nodes with corresponding rear transition modules and one secondary payload node and its corresponding secondary rear transition module. Secondary payload node 114 and secondary rear transition module 112 can be used as a spare in the event one of payload nodes has a failure. For example, in accordance with an embodiment of the invention, failure of payload node 104 causes DSX signal 105 to be automatically shunted to secondary payload node 114 for processing using the apparatus and method described below. Failure of payload node 104 can include, but is not limited to, electrical, mechanical, logical or other malfunction that prevents payload node 104 from accomplishing its intended task. For example, a power failure on payload node 104 is a failure of payload node 102. In another embodiment, multi-service platform system 100 can be configured for a 1+1 configuration where each payload node has a corresponding spare in the chassis or system. In this configuration, the failure of a payload node causes the corresponding DSX signal to be automatically switched over to the corresponding spare payload node using the apparatus and method described below.

In an embodiment, rear transition module 102 is coupled to secondary rear transition module 12 via protection bus 150 outside of backplane 110. In other words, protection bus 150 is not part of the chassis or backplane. Protection bus 150 is an independent bus coupling rear transition module 102 and secondary rear transition module 112 that does not interface or use backplane 110. Therefore, protection bus 150 can be used in existing multi-service platform system chassis and in new multi-service platform system chassis without modification or addition of components. Although protection bus 150 is shown as only one path, it is understood that in an embodiment, protection bus 150 can have both transmit and receive paths. Protection bus 150 is shown as a single path for clarity. In an embodiment, protection bus 150 can be connected to all of the rear transition modules in multi-service platform system 100 regardless of whether the rear transition modules are in a single or multiple chassis. In effect, protection bus "daisy chains" together each of the rear transition modules and secondary rear transition module 112.

In an embodiment, rear transition module 102 can include protection bus interface 128. For example, protection bus interface 128 can include a BNC or TNC type connector for DSX signals similar to that described for DSX signal interface 120. In another embodiment, protection bus interface 128 can be an optical connection, such as OC3 optical fibers, or higher capacity fibers, and the like. Secondary rear transition module 112 can include protection bus interface 140, which is substantially similar to protection bus interface 128. Protection bus 150 is coupled to rear transition module 102 via protection bus interface 128, while secondary rear transition module 112 is coupled to protection bus 150 via protection bus interface 140. Each rear transition module 160, 162 can also have a protection bus interface (not shown for clarity) which couples it to protection bus 150.

Rear transition module 102 can also include relay module 122. Relay module 122 can couple DSX signal interface 120 to LIU 124 allowing DSX signal 105 to reach payload node 104. In an embodiment, this is the default position of relay module 122. Relay module can also be configured such that DSX signal 105 is communicated to protection bus 150 via protection bus interface 128. This is described in more detail below. Relay module 122, can be for example and without limitation, an analog relay module as is known in the art.

Secondary rear transition module 112 can include bypass control module 144. In an embodiment, bypass control module 144 can detect failure of payload node 104 via backplane 110. Upon detection of failure of payload node 104, bypass control module 144 can communicate bypass signal 134 to rear transition module 102, particularly to control module 126. Control module 126 can then switch relay module 122 such that DSX signal 105 is shunted through rear transition module 102 to secondary rear transition module 112 via protection bus 150. Secondary rear transition module 112 independently controls both control module 126 and relay module 122. Secondary rear transition module 112 operates independently to detect payload node 104 failures and shunt DSX signal 105 without any reliance on circuitry or signals from payload node 104. In effect secondary rear transition module 112 does not rely on any circuitry that may be the source of the payload node failure.

In an embodiment, rear transition module 102 can also comprise control module 126, which can comprise a serial register, coupled to receive a bypass signal 134 from secondary rear transition module 112 to activate relay module 122. Control module 126 can be coupled to secondary rear transition module 112 via a control bus 152. In an embodiment, control bus 152 can be part of protection bus 150. In another embodiment, control bus 152 can be separate from protection bus 150. In either embodiment, control bus 152 is also outside of and separate from backplane 110. Control bus 152 can be coupled to the control module of other rear transition modules 160, 162 as well. Since control module 126 is independently controlled by secondary rear transition module 112, control module 126 is also independently powered by secondary rear transition module 112 to protect against failure of payload node 104 and power to rear transition module 102. Control module of other rear transition modules 160, 162 is also independently controlled and powered by secondary rear transition module 112.

Control module 126 can also comprise bypass timer 130 coupled to define bypass timing period 132. Bypass timer 130 can begin bypass timing period 132, for example, upon receipt of bypass signal 134 from secondary rear transition module 112. Bypass timing period 132 can be a definite but arbitrary value set by a system architect or a user of multi-service platform system 100. In an embodiment, upon failure of payload node 104, secondary rear transition module 112 periodically communicates bypass signal 134 to rear transition module 102, particularly to control module 126. The initial communication of bypass signal 134 initiates bypass timing period 132.

Thereafter, in order to maintain the shunting of DSX signal 105 to secondary rear transition module 112, the secondary rear transition module 112 must periodically communicate bypass signal 134 to rear transition module 102 prior to expiration of bypass timing period 132. If bypass signal 134 is not received by rear transition module 102 prior to expiration of bypass timing period 132, DSX signal 105 reverts back passing through rear transition module 102 to payload node 104. In other words, control module 126 will release relay module 122 such that DSX signal 105 passes through rear transition module 102 to payload node 104. This feature ensures that failure of secondary rear transition module 112 or secondary payload node 114 permits rear transition module 102 to resume control over DSX signal 105.

Upon DSX signal 105 being shunted to secondary rear transition module 112, DSX signal 105 is further communicated via LIU 142 to secondary payload node 114 for processing. DSX signal 105 is shunted to secondary payload node 114 for processing in the event payload node 104 fails. Since shunting of DSX signal 105 is independently controlled by secondary rear transition module 112, the failure of payload node 104 does not affect the ability of secondary rear transition module 112 to operate relay module 122 to shunt DSX signal 105. Relay module 122 defaults or fails to such that DSX signal 105 is communicated to payload node 104. If secondary rear transition module 112 or secondary payload node 114 fail, it has no effect on rear transition module 102, payload node 104 or DSX signal 105 being processed by payload node 104.

Control module 126 can also issue a status signal 133 upon receipt of bypass signal 134. Status signal 133 can communicate to payload node 104 that DSX signal 105 is shunted to secondary rear transition module 112. In an embodiment, if payload node 104 receives status signal 133 indicating DSX signal 105 is shunted, but payload node 104 has not failed, payload node 104 can then reacquire DSX signal 105 or silence secondary rear transition module 112 or secondary payload node 114.

In an embodiment, protection bus 150 is coupled to other rear transition modules 160, 162 in multi-service platform system 100. In this embodiment, failure of payload node 161 or payload node 163 operates to shunt DSX signal 107 or DSX signal 109 respectively to secondary rear transition module 112 in the manner described above.

In an embodiment, each rear transition module 102 contains its own unique address as recognized by protection bus 150. When a payload node fails and a DSX signal is shunted, the address of the corresponding rear transition module is placed on the protection bus 150 so that other rear transition modules know that protection bus 150 is already in use. Other control modules are then aware that protection bus and secondary rear transition module 112 are in use. This is to prevent other rear transition modules from attempting to use protection bus to shunt DSX signal while protection bus is in use. In this manner, protection bus, secondary rear transition module 112 and secondary payload node 114 only operate as a spare for a failure of one payload node within multi-service platform system 100.

Figure 2:
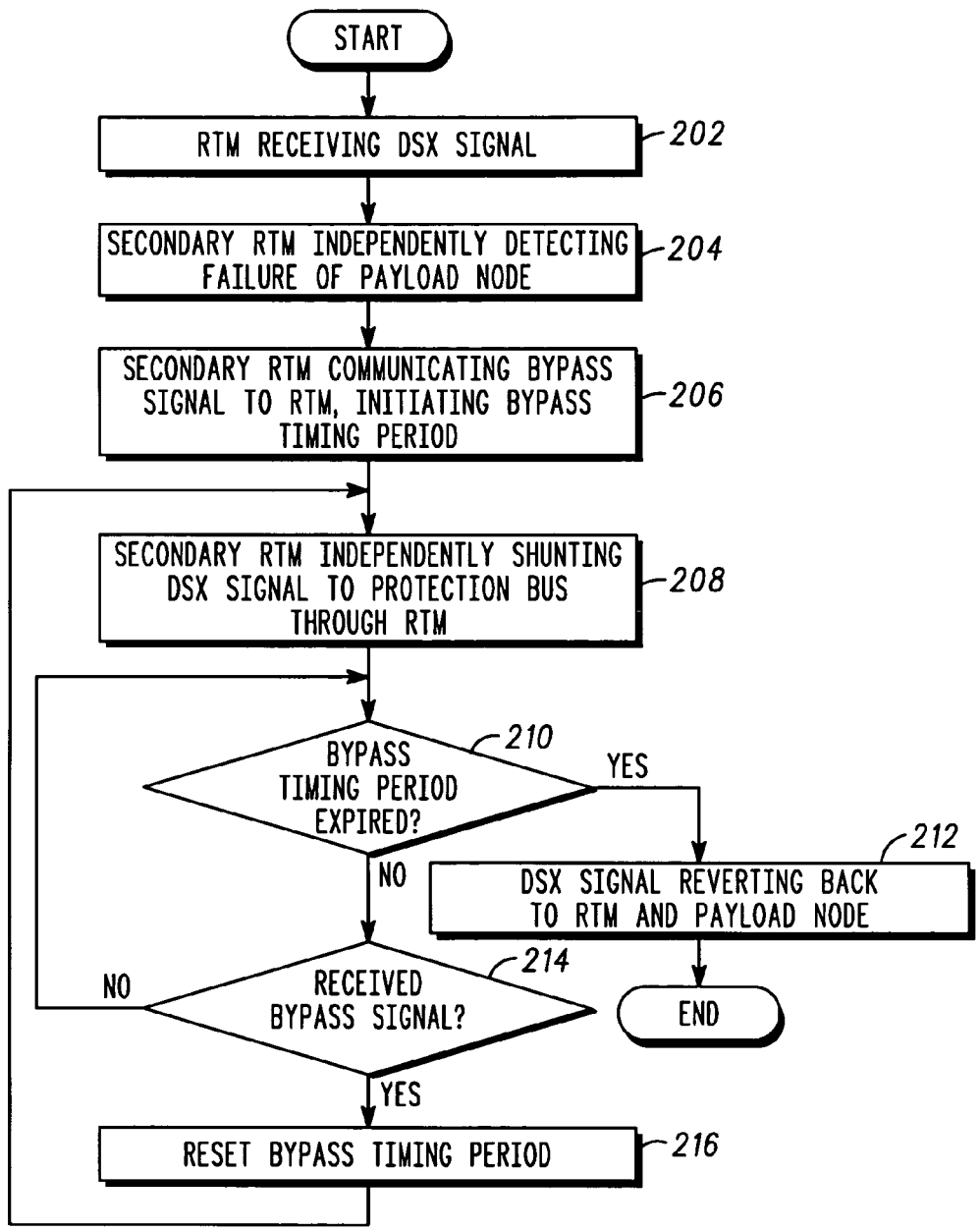
FIG. 2 illustrates a flow diagram according to an embodiment of the invention.

FIG. 2 illustrates a flow diagram 200 according to an embodiment of the invention. In step 202, rear transition module (RTM) 102 is receiving DSX signal 105. In step 204, secondary rear transition module 112 independently detects failure of payload node 104. In step 206, secondary rear transition module 112 communicates bypass signal 134 to rear transition module 102, initiating bypass timing period 132.

In step 208, secondary rear transition module 112 independently shunts DSX signal 105 to protection bus 150 through rear transition module 102 such that DSX signal 105 is communicated to secondary rear transition module 112 for processing by secondary payload node 114, where protection bus 150 is outside of backplane 110. Secondary rear transition module 112 independently controls shunting of DSX signal 105 through rear transition module 102 to secondary rear transition module 112.

In step 210 it is determined if bypass timing period 132 has expired. If bypass timing period 132 has expired, DSX signal 105 reverts back to passing through rear transition module 102 to payload node per step 212. If bypass timing period 132 has not expired, it is determined in step 214 if bypass signal 134 has been received from secondary rear transition module 112 during bypass timing period 132. If not, it is again checked if bypass timing period 132 has expired per step 210. If bypass signal 134 is received prior to expiration of bypass timing period 132, bypass timing period 132 is reset per step 216 and shunting of DSX signal 105 continues per step 208.

While we have shown and described specific embodiments of the present invention, further modifications and improvements will occur to those skilled in the art. It is therefore to be understood that appended claims are intended to cover all such modifications and changes as fall within the true spirit and scope of the invention.

What is claimed is:

1. A multi-service platform system, comprising:
    a rear transition module coupled to receive a DSX signal, wherein the rear transition module further comprises a bypass timer coupled to define a bypass timing period;
    a payload node coupled to the rear transition module via a backplane, wherein the payload node is coupled to process the DSX signal;
    a secondary rear transition module;
    a secondary payload node coupled to the secondary rear transition module via the backplane; and
    a protection bus coupling the rear transition module to the secondary rear transition module outside the backplane, wherein failure of the payload node operates to shunt the DSX signal through the rear transition module to the secondary rear transition module, wherein failure of the payload node operates to switch processing of the DSX signal from the payload node to the secondary payload node, and wherein the secondary rear transition module independently controls shunting of the DSX signal through the rear transition module to the secondary rear transition module, wherein upon failure of the payload node, the secondary rear transition module periodically communicates a bypass signal to the rear transition module initiating the bypass timing period, and wherein if the rear transition module fails to receive the bypass signal prior to expiration of the bypass timing period, the DSX signal reverts back to passing through the rear transition module to the payload node.

2. The multi-service platform system of claim 1, wherein upon receipt of the bypass timing signal, the bypass timing period is reset.

3. A rear transition module coupled to transmit a DSX signal to a payload node via a backplane, the rear transition module comprising:
 a DSX signal interface coupled to receive the DSX signal;
 a protection bus interface, wherein the protection bus interface is coupled to a secondary rear transition module via a protection bus, wherein the protection bus is outside the backplane;
 a relay module coupled to switch the DSX signal from the payload node to the secondary rear transition module for processing by a secondary payload node; and
 a control module, wherein the control module operates to switch the relay module such that the DSX interface is coupled to the protection bus interface upon failure of the payload node and receipt of a bypass signal from the secondary rear transition module, and wherein the control module is independently controlled by the secondary rear transition module, wherein the control module further comprises a bypass timer coupled to define a bypass timing period, wherein upon failure of the payload node, the secondary rear transition module communicates the bypass signal to the control module initiating the bypass timing period, and wherein if the control module fails to receive the bypass signal prior to expiration of the bypass timing period, the DSX signal reverts back to the rear transition module from the secondary rear transition module.

4. The rear transition module of claim 3, wherein upon receipt of the bypass timing signal, the bypass timing period is reset.

5. A method, comprising:
 a rear transition module receiving a DSX signal, wherein the rear transition module passes the DSX signal to a payload node through a backplane;
 a secondary rear transition module independently detecting failure of the payload node;
 the secondary rear transition module independently shunting the DSX signal to a protection bus through the rear transition module such that the DSX signal is communicated to the secondary rear transition module for processing by a secondary payload node, wherein the protection bus is outside the backplane, and wherein the secondary rear transition module independently controls shunting of the DSX signal through the rear transition module to the secondary rear transition module;
 the secondary rear transition module periodically communicating a bypass signal to the rear transition module;
 receipt of the bypass signal initiating a bypass timing period; and
 if the rear transition module fails to receive the bypass signal prior to expiration of the bypass timing period, the DSX signal reverting back to passing through the rear transition module to the payload node.

6. The method of claim 5, further comprising upon receipt of the bypass signal resetting the bypass timing period.

7. A secondary rear transition module, comprising:
 a protection bus interface, wherein the protection bus interface is coupled to a rear transition module via a protection bus, wherein the protection bus is outside of a backplane; and
 a bypass control module, wherein the bypass control module operates to switch a relay module on the rear transition module such that a DSX signal received at the rear transition module is shunted through the rear transition module to the secondary rear transition module upon failure of a payload node coupled to the rear transition module, and wherein the secondary rear transition module independently detects the failure of the payload node and independently controls the shunting of the DSX signal, wherein the secondary rear transition module periodically communicates a bypass signal to the rear transition module initiating a bypass timing period, and wherein if the rear transition module fails to receive the bypass signal prior to expiration of the bypass timing period, the DSX signal reverts back to passing through the rear transition module to the payload node.

* * * * *